United States Patent
Horn

(10) Patent No.: US 9,070,379 B2
(45) Date of Patent: Jun. 30, 2015

(54) DATA MIGRATION FOR DATA STORAGE DEVICE

(71) Applicant: Western Digital Technologies, Inc., Irvine, CA (US)

(72) Inventor: Robert L. Horn, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/086,916

(22) Filed: Nov. 21, 2013

(65) Prior Publication Data
US 2015/0062743 A1   Mar. 5, 2015

Related U.S. Application Data

(60) Provisional application No. 61/871,270, filed on Aug. 28, 2013.

(51) Int. Cl.
| | | |
|---|---|---|
| *G06F 12/00* | (2006.01) | |
| *G06F 13/00* | (2006.01) | |
| *G11B 5/09* | (2006.01) | |
| *G06F 3/06* | (2006.01) | |

(52) U.S. Cl.
CPC ............. *G11B 5/09* (2013.01); *G06F 3/0617* (2013.01); *G06F 3/0647* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 5,333,138 A | 7/1994 | Richards et al. | |
| 5,420,998 A | 5/1995 | Horning | |
| 5,457,786 A | 10/1995 | Roush | |
| 5,471,604 A * | 11/1995 | Hasbun et al. | 711/4 |
| 5,581,785 A | 12/1996 | Nakamura et al. | |
| 5,586,291 A | 12/1996 | Lasker et al. | |
| 5,636,355 A | 6/1997 | Ramakrishnan et al. | |
| 5,682,273 A | 10/1997 | Hetzler | |
| 5,905,901 A | 5/1999 | Klein | |
| 5,913,067 A | 6/1999 | Klein | |
| 5,954,820 A | 9/1999 | Hetzler | |
| 6,044,439 A | 3/2000 | Ballard et al. | |
| 6,115,200 A | 9/2000 | Allen et al. | |
| 6,236,527 B1 | 5/2001 | Uchiike et al. | |
| 6,275,949 B1 | 8/2001 | Watanabe | |
| 6,295,577 B1 | 9/2001 | Anderson et al. | |
| 6,408,357 B1 | 6/2002 | Hanmann et al. | |
| 6,429,990 B2 | 8/2002 | Serrano et al. | |
| 6,437,935 B1 | 8/2002 | Johnson et al. | |
| 6,614,616 B1 | 9/2003 | Michel et al. | |
| 6,661,591 B1 | 12/2003 | Rothberg | |
| 6,662,267 B2 | 12/2003 | Stewart | |
| 6,687,850 B1 | 2/2004 | Rothberg | |
| 6,725,397 B1 | 4/2004 | Emberty et al. | |

(Continued)

OTHER PUBLICATIONS

U.S. Appl. No. 12/720,568, filed Mar. 9, 2010, 22 pages.

(Continued)

*Primary Examiner* — K. Wong

(57) ABSTRACT

Migration of data in a data storage device (DSD). A spindle motor of the DSD is controlled to rotate a disk of the DSD to perform at least one operation on the disk and an operational activity level is determined for performing the at least one operation. It is determined whether the operational activity level is greater than a target level, and if it is determined that the operational activity level is not greater than the target level, data is transferred between a solid state memory of the DSD and the disk while the disk rotates.

25 Claims, 4 Drawing Sheets

(56) References Cited

U.S. PATENT DOCUMENTS

| | | | |
|---|---|---|---|
| 6,732,241 B2 | 5/2004 | Riedel |
| 6,754,021 B2 | 6/2004 | Kisaka et al. |
| 6,798,599 B2 | 9/2004 | Dykes et al. |
| 6,807,630 B2 | 10/2004 | Lay et al. |
| 6,845,456 B1 | 1/2005 | Menezes et al. |
| 6,856,556 B1 | 2/2005 | Hajeck |
| 6,892,313 B1 | 5/2005 | Codilian et al. |
| 6,909,574 B2 | 6/2005 | Aikawa et al. |
| 6,928,518 B2 | 8/2005 | Talagala |
| 6,968,450 B1 | 11/2005 | Rothberg et al. |
| 7,003,620 B2 | 2/2006 | Avraham et al. |
| 7,017,037 B2 | 3/2006 | Fortin et al. |
| 7,028,174 B1 | 4/2006 | Atai-Azimi et al. |
| 7,076,605 B1 | 7/2006 | Son |
| 7,082,494 B1 | 7/2006 | Thelin et al. |
| 7,107,444 B2 | 9/2006 | Fortin et al. |
| 7,114,029 B1 | 9/2006 | Thelin |
| 7,120,806 B1 | 10/2006 | Codilian et al. |
| 7,126,857 B2 | 10/2006 | Hajeck |
| 7,139,933 B2 | 11/2006 | Hsu et al. |
| 7,142,385 B2 | 11/2006 | Shimotono et al. |
| 7,206,948 B2 | 4/2007 | Brauer |
| 7,231,198 B2 | 6/2007 | Loughran |
| 7,254,721 B1 | 8/2007 | Tobias et al. |
| 7,275,166 B2 | 9/2007 | Kaiju et al. |
| 7,334,082 B2 | 2/2008 | Grover et al. |
| 7,340,647 B2 | 3/2008 | Aasheim et al. |
| 7,350,105 B2 | 3/2008 | Aasheim et al. |
| 7,392,340 B1 | 6/2008 | Dang et al. |
| 7,395,452 B2 | 7/2008 | Nicholson et al. |
| 7,411,757 B2 | 8/2008 | Chu et al. |
| 7,421,552 B2 | 9/2008 | Long |
| 7,425,810 B2 | 9/2008 | Hobbet et al. |
| 7,430,136 B2 | 9/2008 | Merry, Jr. et al. |
| 7,447,807 B1 | 11/2008 | Merry et al. |
| 7,461,202 B2 | 12/2008 | Forrer, Jr. et al. |
| 7,468,854 B2 | 12/2008 | Yamashita et al. |
| 7,472,222 B2 | 12/2008 | Auerbach et al. |
| 7,477,477 B2 | 1/2009 | Maruchi et al. |
| 7,483,234 B2 | 1/2009 | Shimozato |
| 7,502,256 B2 | 3/2009 | Merry, Jr. et al. |
| 7,509,441 B1 | 3/2009 | Merry et al. |
| 7,509,471 B2 | 3/2009 | Gorobets |
| 7,516,346 B2 | 4/2009 | Pinheiro et al. |
| 7,552,347 B2 | 6/2009 | Schutte |
| 7,596,643 B2 | 9/2009 | Merry, Jr. et al. |
| 7,610,438 B2 | 10/2009 | Lee et al. |
| 7,610,445 B1 | 10/2009 | Manus et al. |
| 7,613,876 B2 | 11/2009 | Bruce et al. |
| 7,620,773 B2 | 11/2009 | Nicholson et al. |
| 7,644,231 B2 | 1/2010 | Recio et al. |
| 7,647,513 B2 | 1/2010 | Tobias et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,360 B1 | 3/2010 | Brunnett et al. |
| 7,685,374 B2 | 3/2010 | Diggs et al. |
| 7,698,586 B2 | 4/2010 | Kim et al. |
| 7,719,785 B2 | 5/2010 | Taniguchi et al. |
| 7,733,712 B1 | 6/2010 | Walston et al. |
| 7,752,491 B1 | 7/2010 | Liikanen et al. |
| 7,765,373 B1 | 7/2010 | Merry et al. |
| 7,774,556 B2 | 8/2010 | Karamcheti et al. |
| 7,797,487 B2 * | 9/2010 | Lubbers et al. ............... 711/113 |
| 7,817,372 B2 | 10/2010 | Takahashi |
| 7,835,104 B2 | 11/2010 | Yamashita et al. |
| 7,890,691 B2 * | 2/2011 | Jiang ............... 711/103 |
| 7,890,696 B2 * | 2/2011 | Lawson ............... 711/112 |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 7,984,259 B1 | 7/2011 | English |
| 8,060,707 B2 | 11/2011 | Fairhurst et al. |
| 8,078,918 B2 | 12/2011 | Diggs et al. |
| 8,090,899 B1 | 1/2012 | Syu |
| 8,095,851 B2 | 1/2012 | Diggs et al. |
| 8,098,451 B2 | 1/2012 | Graef |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,139,307 B2 | 3/2012 | Kim et al. |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,169,726 B2 | 5/2012 | Wilson |
| 8,243,525 B1 | 8/2012 | Kan |
| 8,244,975 B2 * | 8/2012 | DeCenzo ............... 711/112 |
| 8,245,003 B2 | 8/2012 | Suzuki et al. |
| 8,254,172 B1 | 8/2012 | Kan |
| 8,261,012 B2 | 9/2012 | Kan |
| 8,286,018 B2 | 10/2012 | Chang et al. |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,644 B2 | 12/2013 | Kumasawa et al. |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,719,501 B2 | 5/2014 | Flynn et al. |
| 8,745,277 B2 | 6/2014 | Kan |
| 8,773,802 B1 | 7/2014 | Anderson et al. |
| 8,775,720 B1 | 7/2014 | Meyer et al. |
| 8,782,334 B1 | 7/2014 | Boyle et al. |
| 2002/0083264 A1 | 6/2002 | Coulson |
| 2003/0140198 A1 | 7/2003 | Ninose et al. |
| 2003/0145167 A1 | 7/2003 | Tomita |
| 2005/0108473 A1 | 5/2005 | Le Moal et al. |
| 2005/0120251 A1 | 6/2005 | Fukumori |
| 2006/0075185 A1 | 4/2006 | Azzarito et al. |
| 2006/0080501 A1 | 4/2006 | Auerbach et al. |
| 2006/0195657 A1 | 8/2006 | Tien et al. |
| 2007/0006021 A1 | 1/2007 | Nicholson et al. |
| 2007/0050540 A1 | 3/2007 | Klein |
| 2007/0162693 A1 | 7/2007 | Nam |
| 2008/0024899 A1 | 1/2008 | Chu et al. |
| 2008/0040537 A1 | 2/2008 | Kim |
| 2008/0049354 A1 | 2/2008 | Nitta |
| 2008/0059694 A1 | 3/2008 | Lee |
| 2008/0130156 A1 | 6/2008 | Chu et al. |
| 2008/0177938 A1 | 7/2008 | Yu |
| 2008/0222353 A1 | 9/2008 | Nam et al. |
| 2008/0256287 A1 | 10/2008 | Lee et al. |
| 2008/0288714 A1 | 11/2008 | Salomon et al. |
| 2008/0307270 A1 | 12/2008 | Li |
| 2009/0019218 A1 | 1/2009 | Sinclair et al. |
| 2009/0024793 A1 | 1/2009 | Fontenot et al. |

(56) References Cited

U.S. PATENT DOCUMENTS

| | | |
|---|---|---|
| 2009/0031072 A1 | 1/2009 | Sartore |
| 2009/0089501 A1 | 4/2009 | Ahn et al. |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172249 A1 | 7/2009 | Matthews |
| 2009/0172324 A1 | 7/2009 | Han et al. |
| 2009/0172499 A1 | 7/2009 | Olbrich et al. |
| 2009/0198940 A1 | 8/2009 | Ash et al. |
| 2009/0213486 A1 | 8/2009 | Takahashi |
| 2009/0249168 A1 | 10/2009 | Inoue |
| 2009/0271562 A1 | 10/2009 | Sinclair |
| 2009/0327603 A1 | 12/2009 | McKean et al. |
| 2010/0067138 A1 | 3/2010 | Ooi et al. |
| 2010/0088459 A1 | 4/2010 | Arya et al. |
| 2010/0122030 A1 | 5/2010 | Peters et al. |
| 2010/0169541 A1 | 7/2010 | Freikorn |
| 2010/0174849 A1 | 7/2010 | Walston et al. |
| 2010/0191922 A1 | 7/2010 | Dickey et al. |
| 2010/0195243 A1 | 8/2010 | Zhu et al. |
| 2010/0250793 A1 | 9/2010 | Syu |
| 2010/0325352 A1 | 12/2010 | Schuette et al. |
| 2011/0010490 A1 | 1/2011 | Kwon et al. |
| 2011/0099323 A1 | 4/2011 | Syu |
| 2011/0106804 A1 | 5/2011 | Keeler et al. |
| 2011/0138106 A1 | 6/2011 | Prabhakaran et al. |
| 2011/0202707 A1 | 8/2011 | Moon et al. |
| 2011/0283049 A1 | 11/2011 | Kang et al. |
| 2011/0283128 A1 | 11/2011 | Farhan et al. |
| 2012/0170435 A1 | 7/2012 | Trantham |
| 2012/0260020 A1 | 10/2012 | Suryabudi et al. |
| 2012/0278531 A1 | 11/2012 | Horn |
| 2012/0284460 A1 | 11/2012 | Guda |
| 2012/0290779 A1 | 11/2012 | Eleftheriou et al. |
| 2012/0317338 A1 | 12/2012 | Yi et al. |
| 2012/0324191 A1 | 12/2012 | Strange et al. |
| 2013/0024650 A1 | 1/2013 | Ambat et al. |
| 2013/0117520 A1 | 5/2013 | Ryu |
| 2013/0132638 A1 | 5/2013 | Horn et al. |
| 2013/0145106 A1 | 6/2013 | Kan |
| 2013/0173850 A1 | 7/2013 | Song |
| 2013/0218892 A1 | 8/2013 | Bell, Jr. et al. |
| 2013/0290668 A1 | 10/2013 | Na |
| 2013/0290793 A1 | 10/2013 | Booth et al. |
| 2014/0059405 A1 | 2/2014 | Syu et al. |
| 2014/0115427 A1 | 4/2014 | Guangming |
| 2014/0133220 A1 | 5/2014 | Danilak et al. |
| 2014/0136753 A1 | 5/2014 | Tomlin et al. |

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

DongKyu Lee; Koh, K.; "PDC-NH: Popular data concentration on NAND flash and hard disk drive," 2009 10th IEEE/ACM International Conference on Grid Computing, pp. 196-200, Oct. 13-15, 2009.

Zaihas Amri Fahdzan Hasfar, et. al., U.S. Appl. No. 14/105,603, filed Dec. 13, 2013, 22 pages.

U.S. Appl. No. 12/824,959, filed Jun. 28, 2010, to Boyle et al., 21 pages.

U.S. Appl. No. 13/105,800, filed May 11, 2011, to Boyle et al., 19 pages.

U.S. Appl. No. 13/157,111, filed Jun. 9, 2011, to Wilkins et al., 16 pages.

U.S. Appl. No. 13/673,956, filed Nov. 9, 2012, to Malina et al., 40 pages.

U.S. Appl. No. 14/024,498, filed Sep. 11, 2013 to Chen et al., 19 pages.

International Search Report and Written Opinion dated Nov. 26, 2014 from related PCT Serial No. PCT/US2014/053009, 9 pages.

\* cited by examiner

DATA MIGRATION FOR DATA STORAGE DEVICE

CROSS-REFERENCE TO RELATED APPLICATION

This application claims the benefit of U.S. Provisional Application No. 61/871,270, filed on Aug. 28, 2013, which is hereby incorporated by reference in its entirety.

BACKGROUND

Data storage devices (DSDs) are often used to record data onto or to reproduce data from a storage media. Some DSDs include multiple types of storage media. For example, in the case of a solid state hybrid drive (SSHD), a solid state storage media such as a flash memory is used for storing data in addition to at least one rotating magnetic disk for storing data.

The solid state storage media of the SSHD may be used to store data when the disk is not available for storing data, such as when the disk is not spinning. However, the available capacity of the solid state media is generally limited and data that is only stored in the solid state media usually needs to be migrated to the disk at some point in the future. In addition, data may also need to be migrated from the disk to the solid state media so that, for example, the data is available for quick access when the disk is not spinning or so that the same data is stored on both the disk and the solid state media.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
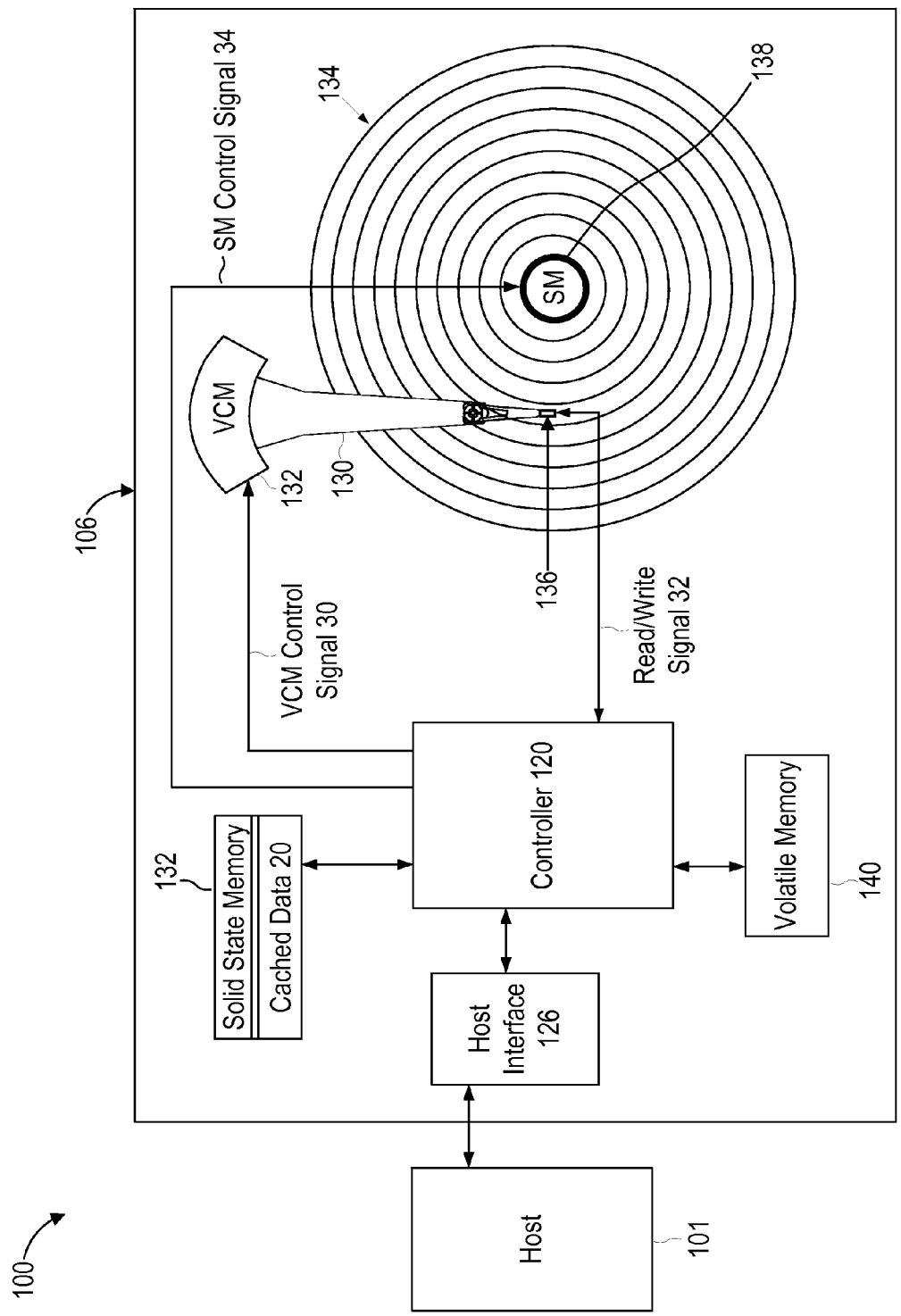
FIG. 1 is a block diagram depicting an electronic system with a data storage device (DSD) according to an embodiment.

FIG. 1 shows electronic system 100 which includes host 101 and data storage device (DSD) 106 in communication with host 101. Electronic system 100 can be, for example, a computer system (e.g., desktop, mobile/laptop, tablet, smartphone, etc.) or other type of electronic device such as a digital video recorder (DVR). In this regard, electronic system 100 may be a stand-alone system or part of a network. Those of ordinary skill in the art will appreciate that electronic system 100 and/or DSD 106 can include more or less than those elements shown in FIG. 1 and that the disclosed processes may be implemented in other environments.

In the embodiment of FIG. 1, DSD 106 is a solid state hybrid drive (SSHD) that includes both magnetic recording media (e.g., disks in disk pack 134) and solid state recording media (e.g., solid state memory 132) as non-volatile memory (NVM) for storing data. While the description herein refers to solid state memory generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

DSD 106 includes controller 120 which includes circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a system on a chip (SoC).

Host interface 126 is configured to interface DSD 106 with host 101 and may interface according to a standard such as, for example, PCI express (PCIe), serial advanced technology attachment (SATA), or serial attached SCSI (SAS). As will be appreciated by those of ordinary skill in the art, host interface 126 can be included as part of controller 120. Although FIG. 1 depicts the co-location of host 101 and DSD 106, in other embodiments the two need not be physically co-located. In such embodiments, DSD 106 may be located remotely from host 101 and connected to host 101 via a network interface.

In the example of FIG. 1, DSD 106 includes rotating magnetic disks arranged in disk pack 134 which is rotated by spindle motor (SM) 138. DSD 106 also includes head stack assembly (HSA) 136 connected to the distal end of actuator 130 which is rotated by voice coil motor (VCM) 132 to position HSA 136 in relation to disk pack 134. Controller 120 can include servo control circuitry (not shown) to control the position of HSA 136 and the rotation of disk pack 134 using VCM control signal 30 and SM control signal 34, respectively. DSD 106 may include firmware stored on disk pack 134 and/or solid state memory 132. Firmware can include computer-readable instructions used by DSD 106 to control the operation of the DSD, which may include data migration between solid state memory 132 and disk pack 134.

Disk pack 134 comprises multiple disks that are radially aligned so as to rotate about SM 138. Each disk in disk pack 134 includes a number of radial spaced, concentric tracks for storing data. HSA 136 includes multiple heads each arranged to read data from and write data to a corresponding surface of a disk in disk pack 134.

DSD 106 also includes solid state memory 132 for storing data. In an embodiment, solid state memory 132 is used to store cached data 20 which may be identical data to, or a most recent copy of, data for selected ranges of logical block addresses (LBAs) on disk pack 134. Cached data 20 can include data that is only stored in solid state memory 132 and is a most recently written version of data for a particular logical address such as an LBA. Such cached data may be referred to as "dirty data," which is periodically synchronized with the disk pack 134 by writing the dirty data to disk pack 134 for the logical address. In one example, dirty data may result from a deferred write operation where data intended to be written to disk pack 134 is first stored in solid state memory 132 as described below in more detail.

Volatile memory 140 can include, for example, a dynamic random access memory (DRAM) which can be used by DSD 106 to temporarily store data. Data stored in volatile memory 140 can include data read from NVM (e.g., disk pack 134 or solid state memory 132), data to be written to NVM, instructions loaded from firmware for execution by controller 120, and/or data used in executing firmware.

In operation, host interface 126 receives host read and write commands from host 101 via host interface 126 for reading data from and writing data to NVM such as solid state memory 132 and disk pack 134. In response to a write command from host 101, controller 120 may buffer the data to be written for the write command in volatile memory 140.

For data to be written to disk pack 134, a read/write channel (not shown) of controller 120 may then encode the buffered data into write signal 32 which is provided to a head of HSA 136 for magnetically writing data to a disk surface of disk pack 134.

In response to a read command for data stored on a disk surface of disk pack 134, controller 120 controls a head of HSA 136 to magnetically read data stored on the surface of disk pack 134 and to send the read data as read signal 32. The read/write channel of controller 120 can then decode and buffer the data into volatile memory 140 for transmission to host 101 via host interface 126.

DSD 106 can also perform a deferred write operation that allows DSD 106 to write data that is to be written to disk pack 134 to solid state memory 132, and then later write the data to its intended location in disk pack 134. This deferred writing can ordinarily allow for servicing of host write commands for writes intended for disk pack 134 while performing other operations in disk pack 134. The deferred write operation can also allow for servicing of host write commands for writes intended for disk pack 134 without requiring disk pack 134 to spin up to an operational speed for writing the data. The data from deferred write operations can be stored in solid state memory 132 as dirty data, but the available capacity for storing dirty data is limited in solid state memory 132. As the amount of dirty data approaches a high level limit, disk pack 134 may need to be spun up to an operational speed to transfer some of dirty data to disk pack 134.

In addition to transferring dirty data to disk pack 134, data may also be transferred from disk pack 134 to solid state memory 132. In this regard, certain data stored on disk pack 134, such as frequently accessed data or high priority data, can be transferred from disk pack 134 to solid state memory 132. In some implementations, the frequently accessed or high priority data may be specified by host 101 by flagging certain data or providing a range of LBAs for data to be transferred from disk pack 134 to solid state memory 132. DSD 106 may migrate frequently accessed data such as, for example, a particular word processing file to solid state memory 132 to reduce a number of times that disk pack 134 needs to be spun up to access such data and to decrease a latency for host 101 to access the data. High priority data, such as an operating system file for example, may be transferred from disk pack 134 to solid state memory 132 in order to provide faster access to the high priority data in solid state memory 132.

As discussed below, the transfer of data between solid state memory 132 and disk pack 134 can be interspersed with other operations performed on disk pack 134 to reduce a number of times that disk pack 134 needs to be spun up (i.e., the number of spin cycles) and to reduce an overall spin time of disk pack 134. This reduction in the number of spin cycles and in the overall spin time can result in a reduction in power consumption and an improved reliability of DSD 106. In addition, an overall performance of DSD 106 can be improved by reducing the latency in accessing data for random reads when the data is stored in solid state memory 132 instead of disk pack 134.

Figure 2:
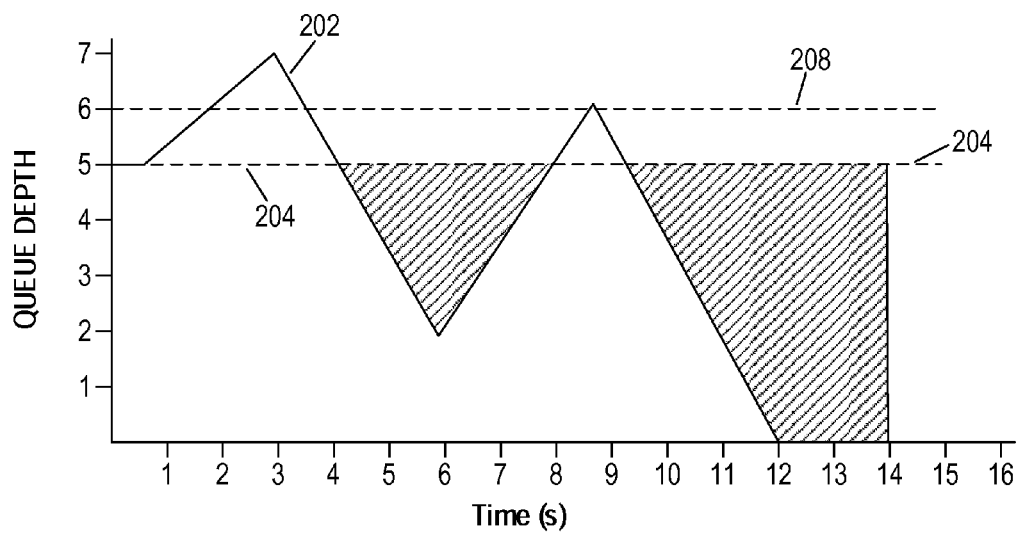
FIG. 2 is a graph depicting an operational activity level of a DSD according to an embodiment.

FIG. 2 depicts an example operational activity level 202 that can be used when transferring data between solid state memory 132 and disk pack 134 according to one embodiment. Operational activity level 202 represents a command queue depth of a number of commands waiting to be performed on disk pack 134. Such commands can include a number of host commands received from host 101 such as read commands or write commands. Operational activity level 202 may also include additional internal commands of DSD 106 such as a command for a scheduled maintenance operation on disk pack 134.

As shown in FIG. 2, operational activity level 202 begins with 5 commands queued at 0 seconds and increases to 7 commands queued at 3 seconds. Part of this initial increase in operational activity can be due to disk pack 134 being spun up to an operational speed.

In the example of FIG. 2, target level 204 at a queue depth of 5 commands serves as a target operational activity level so that when operational activity level 202 falls below target level 204, data is transferred between disk pack 134 and solid state memory 132 to take advantage of disk pack 134 already spinning perform other operations. Target level 204 may be set by controller 120 based on a relatively high performance level or performance limit for performing certain operations on disk pack 134 such as for performing read operations or write operations on disk pack 134.

By transferring data when disk pack 134 is already spinning (e.g., to service command(s) from the host), power can ordinarily be conserved by reducing the need to spin up disk pack 134 solely to transfer data between solid state memory 132 and disk pack 134. In addition, performance efficiency in terms of IOPS can typically be improved by interspersing the transfer of data with other operations to complete more operations during a shorter period of time.

As shown in FIG. 2, the cross-hatched area between operational activity level 202 and target level 204 indicates an available capacity for data transfers between solid state memory 132 and disk pack 134. Transfers of data can be timed based on changes in operational activity level 202 so that the total queue depth reaches target level 204 when considering operational activity level 202 together with the transferring of data between solid state memory 132 and disk pack 134.

When operational activity level 202 falls below target level 204, controller 120 transfers data between solid state memory 132 and disk pack 134. The occurrence of transfer activity generally corresponds to the cross-hatched area between operational activity level 202 and target level 204 in FIG. 2. When operational activity level 202 rises above target level 204, such as at approximately 8 seconds, controller 120 stops transferring data between solid state memory 132 and disk pack 134 until operational activity level 202 again falls below target level 204.

In other embodiments, controller 120 may continue to transfer data between solid state memory 132 and disk pack 134 when operational activity level 202 rises above target level 204. In such embodiments, controller 120 may set a baseline rate of transfer when operational activity level 202 is greater than target level 204 and then increase the rate of transfer as operational activity level 202 decreases below target level 204.

In the embodiment of FIG. 2, the amount of data to be transferred at a given time can be set based on operational activity level 202 so as to reach target level 204. In some implementations, the amount of data that is transferred at a given time is also set based on an amount of cached data 20 stored in solid state memory 132. For example, more data may be transferred when the amount of cached data 20 approaches a high level in solid state memory 132, such as within 10% of a high level. In other implementations, the transfer of data may even delay performance of operations corresponding to operational activity level 202 if the amount of cached data 20 has reached a critical level, such as within 2% of a high level limit. The amount of data transferred may also be decreased as cached data 20 approaches a low level limit.

In some embodiments, the target level may be adjusted (e.g., dynamically adjusted) to a different activity level. For example, target level 204 may be adjusted up to target level 208 if the need to transfer data between solid state memory 132 and disk pack 134 becomes more urgent. Factors that may result in an adjustment of the target level can include an available capacity of solid state memory 132, an amount of dirty data stored in solid state memory 132, or an age of dirty data stored in solid state memory 132. In one example, the target level may be increased if the amount of data to be transferred from solid state memory 132 to disk pack 134 exceeds a threshold amount of data. The target level may also be increased if the amount of data to be transferred from disk pack 134 to solid state memory 132 exceeds a threshold or if a total amount of data to be transferred in both directions exceeds a threshold.

The selection of which data to transfer can be made in part based on the operations corresponding to operational activity level 202. For example, controller 120 may select certain data to transfer based on a rotational position optimization (RPO) algorithm so that movement of HSA 136 is reduced. In one such example, controller 120 may identify specific portions of data to transfer that have logical addresses (e.g., LBAs) addressed near data that is being written to or read from disk pack 134 for operations corresponding to operational activity level 202.

In other examples, controller 120 may identify dirty data addressed with logical addresses within a range of logical addresses that are being refreshed in disk pack 134 as part of a disk maintenance activity affecting operational activity level 202. This can allow for the more recent dirty data to be written to disk pack 134 when refreshing the range of logical block addresses rather than using data from disk pack 134 that might be obsolete. Similarly, controller 120 may identify dirty data within a range of logical addresses associated with a garbage collection or defragmentation process affecting operational activity level 202.

In FIG. 2, operational activity level 202 goes to a command depth of zero at 12 seconds when DSD 106 completes performing the operation or operations that disk pack 134 was initially spun up to perform. On the other hand, data transfers between solid state memory 132 and disk pack 134 continue past 12 seconds until stopping at 14 seconds when all of the data that has been identified by controller 120 for migration has been transferred between solid state memory 132 and disk pack 134. The additional time between 12 seconds and 14 seconds for transferring data can be used, for example, to further reduce the amount of dirty data stored in solid state memory 132 below a certain level.

In some implementations, controller 120 maintains power saving timers to trigger a power saving action of DSD 106 after a certain amount of time since receiving a last read or write command from host 101. In such implementations, the completion of the transfer of data does not extend the power saving timers. In other words, disk pack 134 may enter a power saving state at 14 seconds without having to wait for the expiration of a power saving timer that would have otherwise expired before 14 seconds if not for the transferring of data between solid state memory 132 and disk pack 134. Power saving actions may include moving HSA 136 away from disk pack 134 (i.e., parking HSA 136) and reducing the angular speed of disk pack 134.

Figure 3:
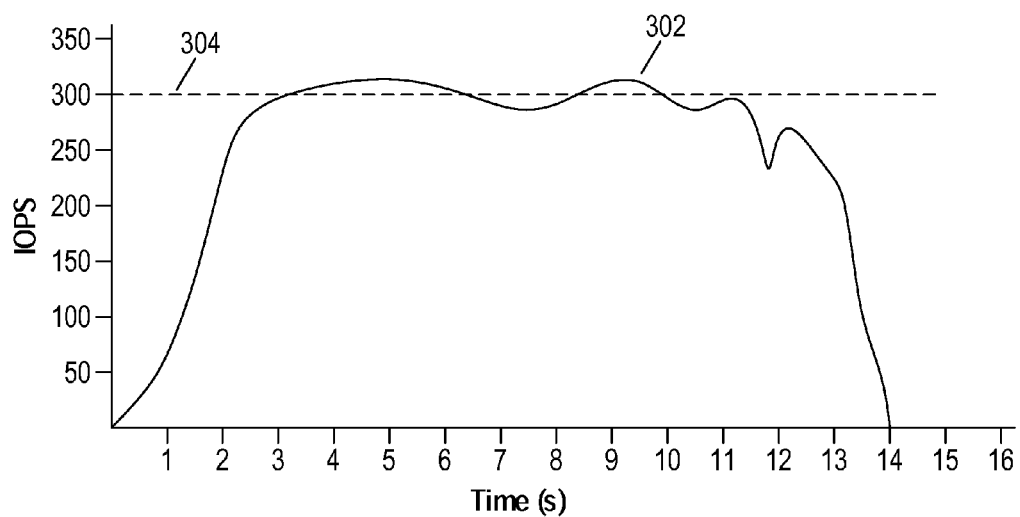
FIG. 3 is a graph depicting performance of the DSD of FIG. 2 according to an embodiment.

FIG. 3 depicts performance curve 302 in terms of a number of input/output operations per second (IOPS) that are performed by HSA 136 on disk pack 134 over the period shown in FIG. 2 according to an embodiment. In the example of FIG. 3, the performance level 304 at 300 IOPS roughly corresponds to when operational activity level 202 and transfer activity reach target level 204 after initially spinning up disk pack 134. In this regard, performance level 304 can correspond to a relatively high performance level for DSD 106 in performing read or write operations on disk pack 134.

As shown in FIG. 3, performance curve 302 increases during an initial spin up until it reaches performance level 304 after 3 seconds. Although operational activity level 202 in FIG. 2 decreases between 4 and 6 seconds, performance curve 302 remains near performance level 304 during this period with the addition of transfer activity to operational activity level 202. Performance curve 302 also remains elevated as operational activity level 202 decreases after about 9 seconds in FIG. 2.

As discussed above, by interspersing the transfer of data with other operations, performance efficiency of DSD 106 can ordinarily be increased to complete more operations during a shorter period of time.

Figure 4:
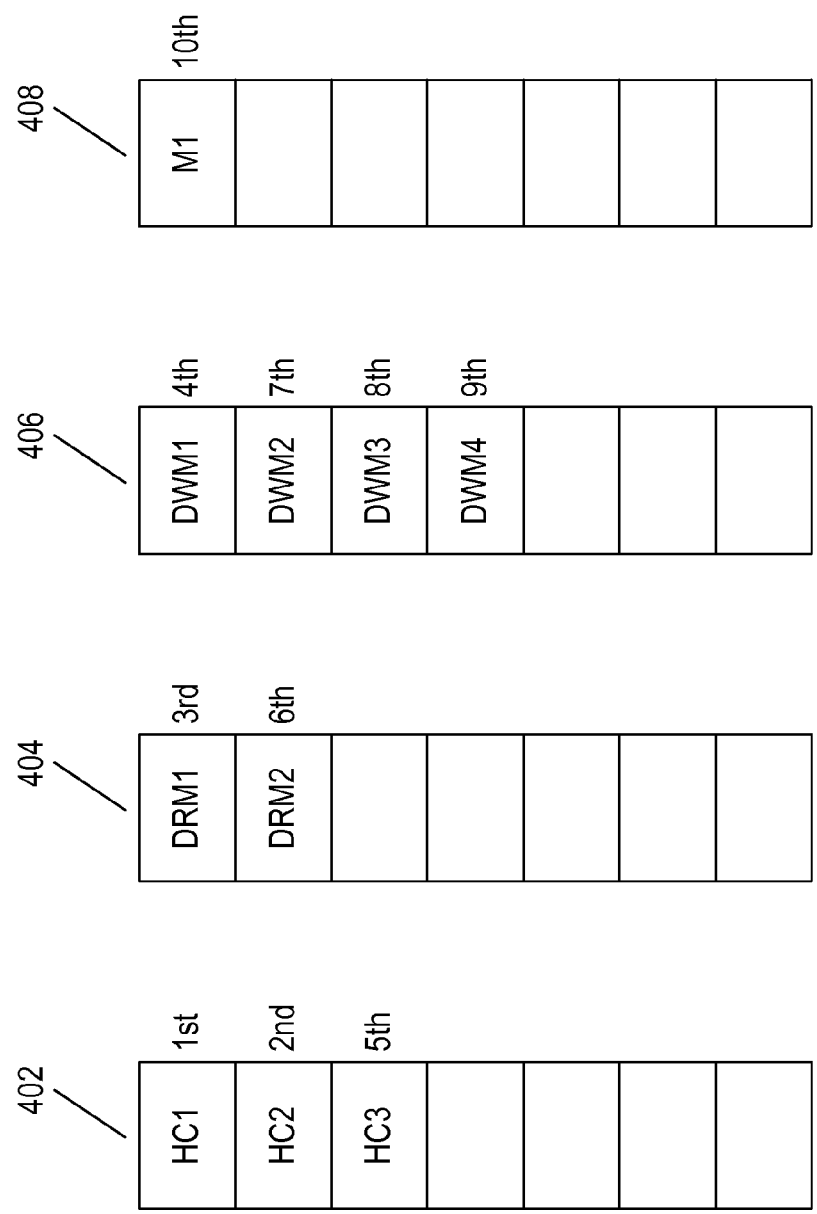
FIG. 4 is a diagram illustrating queues of pending operations for a DSD according to an embodiment.

FIG. 4 is a diagram illustrating different queues of pending operations for disk pack 134 according to an embodiment. The queues of FIG. 4 may be maintained by controller 120 in volatile memory 140. As shown in FIG. 4, queues 402, 404, 406 and 408 each include pending operations of a certain type. For example, the queues may be used as part of an RPO algorithm in which pending operations are selected from these queues based on their target physical locations on the disk media.

Queue 402 is a queue for pending operations to service host commands received from host 101 (e.g., HC1, HC2 and HC3). The pending operations queued in queue 402 can include, for example, read commands for accessing data from DSD 106 or write commands for storing data in DSD 106. In some embodiments, the host commands queued in queue 402 can constitute an operational activity level, such as operational activity level 202 in FIG. 2. In other embodiments, DSD 106 may maintain separate queues of operations for host read commands and host write commands.

Queue 404 is a queue for pending data transfer operations from disk pack 134 to solid state memory 132 (i.e., data read migrations), such as DRM1 and DRM2. Such data read migrations can be for data that is frequently accessed on disk 134 or high priority data that is to be stored in both disk pack 134 and in solid state memory 132 for redundancy.

Queue 406 is a queue for pending data transfer operations from solid state memory 132 to disk pack 134 (i.e., data write migrations), such as DWM1, DWM2, DWM3, and DWM4. Such data write migrations can include transfers of portions of dirty data to disk pack 134 after a deferred write, for example.

Queue 408 is a queue for pending maintenance operations to be performed on disk pack 134, such as M1. Such maintenance operations can include garbage collection, defragmentation, and refreshing of data in disk pack 134 for a particular range of logical addresses.

In the embodiment of FIG. 4, controller 120 sequences the performance of the pending operations among queues 402, 404, 406, and 408 based on a predetermined quality of service for the pending operations in at least one of the queues. For example, controller 120 may set a predetermined rate of performance for the host command operations in queue 402 to provide a particular quality of service in servicing commands from host 101. The predetermined rate of performance for queue 402 is set by controller 120 in FIG. 4 such that two of every five operations performed by DSD 106 are from queue 402. In addition, predetermined rates of performance are set for queues 404 and 406 such that one of every five operations performed by DSD 106 is from each of queues 404 and 406. Controller 120 sequences the operations in queues 402, 404, 406 and 408 in the order shown in FIG. 4 with HC1 being performed first and M1 being performed last. In an embodiment, these selection factors may be integrated into an RPO algorithm, or used in place of an RPO algorithm.

Controller 120 may also change the predetermined rates of operations being selected from the queues and/or change the sequence of operations based on the considerations discussed above for adjusting the target level. In other words, the predetermined rates and/or the sequence may be changed based on at least one of an amount of data to be transferred from the disk pack 134 to the solid state memory 132, an available capacity of solid state memory 132, an amount of dirty data stored in solid state memory 132, and an age of dirty data stored in solid state memory 132. Again, these selection factors may be integrated into an RPO algorithm, or used in place of an RPO algorithm.

Figure 5:
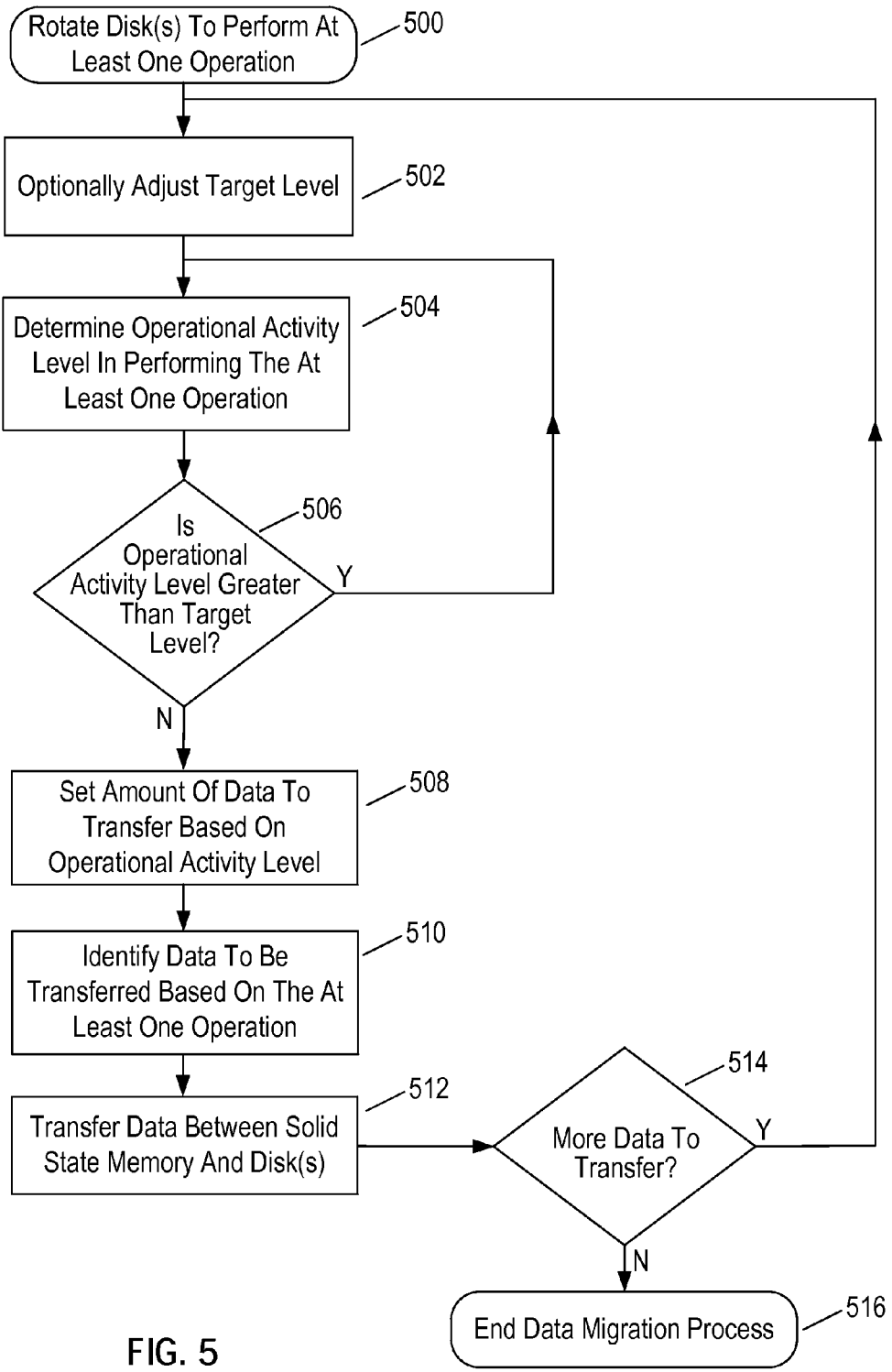
FIG. 5 is a flowchart for a data migration process according to an embodiment.

FIG. 5 is a flowchart for a data migration process which can be performed by controller 120 according to one embodiment. In block 500, controller 120 controls SM 138 to rotate disk pack 134 to perform at least one operation which can include, for example, a read operation, a write operation, or a disk maintenance operation such as garbage collection, defragmentation, and refreshing of data in disk pack 134.

In block 502, controller 120 may optionally adjust a target level for operational activity, such as from target level 204 to target level 208 in FIG. 3. The adjustment in the target level can be based on at least one of an amount of data to be transferred from the disk pack 134 to the solid state memory 132, an available capacity of solid state memory 132, an amount of dirty data, and an age of dirty data.

In block 504, controller 120 determines an operational activity level for disk pack 134 in performing the at least one operation from block 500. As discussed above, the operational activity level can include a number of commands queued for performance on disk pack 134, such as a number of host commands queued in queue 402 of FIG. 4.

In block 506, controller 120 determines whether the operational activity level is greater than the target level. If so, the process returns to block 504 to determine an updated operational activity level and to compare the updated operational activity level to the target level in block 506.

If the operational activity level is not greater than the target level, controller 120 in block 508 sets an amount of data to be transferred between solid state memory 132 and disk pack 134. In more detail, the amount of data is set based on the difference between the target level and the current operational activity level. In addition to the current operational activity level, the amount of data to be transferred may also be set based on the amount of dirty data stored in solid state memory 132. As the amount of dirty data increases, the amount of dirty data to be transferred can be increased. In one implementation, the performance of other operations such as the at least one operation of block 500 may be delayed if the amount of dirty data has exceeded a high level limit.

In block 510, controller 120 identifies portions of data to be transferred between solid state memory 132 and disk pack 134. The identification of data can include comparing logical addresses (e.g., LBAs) for the data with logical addresses for data involved with other operations performed on disk pack 134. For example, controller 120 may identify logical addresses of data based on an RPO algorithm or may compare logical addresses of data with a range of logical addresses determined by controller 120 for a disk maintenance operation.

In block 512, controller 120 transfers the data identified in block 510 between solid state memory 132 and disk pack 134. Controller 120 checks in block 514 whether there is more data to transfer. This can involve, for example, determining if there are still more data transfer operations queued in either of queues 404 or 406. Controller 120 may also consider whether there are other operations that need to be performed on disk pack 134 such that disk pack 134 will continue spinning. In such an example, controller 120 may determine in block 514 that more data should be transferred even though the previous data transfer operations queued in queues 404 and 406 have been performed. Controller 120 may then consider an amount of cached data 20 stored in solid state memory 132 in selecting more data to transfer. However, controller 120 may determine in block 514 that the amount of dirty data has reached a low level limit and that the transfer of data should stop even though disk pack 134 will continue to spin for the performance of other operations.

If controller 120 determines in block 514 that there is more data to transfer, the process returns to block 502 to optionally adjust the target level and determine a current operational activity level in block 504.

If it is determined in block 514 that there is no more data to transfer, the data migration process of FIG. 5 ends in block 516. In some cases, the at least one operation of block 500 may have already completed before the completion of the transfer of data. In such cases, the data migration process does not add any additional time to any power saving timers used to trigger a power saving action such as spinning down disk pack 134 or parking HSA 136.

By interspersing the migration of data with other operations, it is ordinarily possible to reduce an overall spin time and save power by avoiding spinning up the disk solely to transfer data between solid state memory 132 and disk pack 134. In addition, coordinating the transfer of data with other disk operations to reach a target operational activity level can generally improve a performance efficiency of DSD 106.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage device (DSD), comprising:
   a disk for storing data;
   a spindle motor for rotating the disk;
   a solid state memory for storing data; and
   a controller configured to:
      control the spindle motor to rotate the disk to perform at least one operation on the disk;
      determine a number of commands queued for performing the at least one operation;
      determine whether the number of commands queued is greater than a target level of commands; and
      if it is determined that the number of commands queued is not greater than the target level, transfer data between the solid state memory and the disk to increase the number of commands queued to reach the target level while the disk rotates.

2. The DSD of claim 1, wherein the controller is further configured to set the target level based on a performance limit for performing operations on the disk.

3. The DSD of claim 1, wherein the data transferred between the solid state memory and the disk includes dirty data transferred from the solid state memory to the disk, the dirty data including data that is most recently written for a logical address and that can be used to update the disk by writing the dirty data to the disk for the logical address.

4. The DSD of claim 1, wherein the data transferred between the solid state memory and the disk includes at least one of frequently accessed data and high priority data transferred from the disk to the solid state memory.

5. The DSD of claim 1, wherein the controller is further configured to set an amount of data to be transferred between the solid state memory and the disk to reach the target level while transferring the data.

6. The DSD of claim 1, wherein the controller is further configured to adjust the target level based on at least one of an amount of data to be transferred between the disk and the solid state memory, an available capacity of the solid state memory, an amount of dirty data stored in the solid state memory, and an age of dirty data stored in the solid state memory, wherein the dirty data includes data that is most recently written for a logical address and can be used to update the disk by writing the dirty data to the disk for the logical address.

7. The DSD of claim 1, wherein the controller is further configured to select data to transfer between the solid state memory and the disk based on an addressing of data involved in performing the at least one operation.

8. The DSD of claim 1, further comprising a head for reading and writing data on the disk, wherein the controller is further configured to select data to transfer between the solid state memory and the disk so as to reduce motion of the head in relation to the disk.

9. The DSD of claim 1, wherein the at least one operation includes a data maintenance operation on the disk, and the controller is further configured to:
   determine a range of logical addresses for performing the data maintenance operation on the disk; and
   select data to transfer between the solid state memory and the disk so that the selected data is addressed with logical addresses within the range of logical addresses.

10. The DSD of claim 1, wherein the controller is further configured to maintain a timer for entering a low power state of the DSD, and wherein the transfer of data between the solid state memory and the disk does not delay the timer for entering the low power state such that if the timer expires while data is being transferred between the solid state memory and the disk, the DSD enters the low power state upon the completion of the transferring of data between the solid state memory and the disk.

11. The DSD of claim 1, wherein the controller is further configured to:
   maintain a first queue of pending operations for performance by the DSD;
   maintain a second queue of pending operations for performance by the DSD; and
   sequence performance of the pending operations in the first queue with the pending operations in the second queue based on a predetermined quality of service for performing the pending operations in at least one of the first queue and the second queue;
   wherein the pending operations in the first queue include pending data transfer operations between the solid state memory and the disk, pending maintenance operations for the disk, or pending host command operations for host commands received from a host in communication with the DSD.

12. A method for migrating data in a data storage device (DSD), the method comprising:
controlling a spindle motor of the DSD to rotate a disk of the DSD to perform at least one operation on the disk;
determining a number of commands queued for performing the at least one operation;
determining whether the number of commands queued is greater than a target level of commands; and
if it is determined that the number of commands queued is not greater than the target level, transferring data between a solid state memory of the DSD and the disk to increase the number of commands queued to reach the target level while the disk rotates.

13. The method of claim 12, further comprising setting the target level based on a performance limit for performing operations on the disk.

14. The method of claim 12, wherein the data transferred between the solid state memory and the disk includes dirty data transferred from the solid state memory to the disk, the dirty data including data that is most recently written for a logical address and that can be used to update the disk by writing the dirty data to the disk for the logical address.

15. The method of claim 12, wherein the data transferred between the solid state memory and the disk includes at least one of frequently accessed data and high priority data transferred from the disk to the solid state memory.

16. The method of claim 12, further comprising setting an amount of data to be transferred between the solid state memory and the disk to reach the target level while transferring the data.

17. The method of claim 12, further comprising adjusting the target level based on at least one of an amount of data to be transferred between the disk and the solid state memory, an available capacity of the solid state memory, an amount of dirty data stored in the solid state memory, and an age of dirty data stored in the solid state memory, wherein the dirty data includes data that is most recently written for a logical address that can be used to update the disk by writing the dirty data to the disk for the logical address.

18. The method of claim 12, further comprising selecting data to transfer between the solid state memory and the disk based on an addressing of data involved in performing the at least one operation.

19. The method of claim 12, further comprising selecting data to transfer between the solid state memory and the disk so as to reduce motion of a head in relation to the disk, wherein the head is configured to read and write data on the disk.

20. The method of claim 12, wherein the at least one operation includes a data maintenance operation on the disk, and wherein the method further comprises:
determining a range of logical addresses for performing the data maintenance operation on the disk; and
selecting data to transfer between the solid state memory and the disk so that the selected data is addressed with logical addresses within the range of logical addresses.

21. The method of claim 12, further comprising maintaining a timer for entering a low power state of the DSD, wherein the transferring of data between the solid state memory and the disk does not delay the timer for entering the low power state such that if the timer expires while data is being transferred between the solid state memory and the disk, the DSD enters the low power state upon the completion of the transferring of data between the solid state memory and the disk.

22. The method of claim 12, wherein the method further comprises:
maintaining a first queue of pending operations for performance by the DSD;
maintaining a second queue of pending operations for performance by the DSD; and
sequencing performance of the pending operations in the first queue with pending operations in the second queue based on a predetermined quality of service for performing the pending operations in at least one of the first queue and the second queue;
wherein the pending operations in the first queue include pending data transfer operations between the solid state memory and the disk, pending maintenance operations for the disk, or pending host command operations received for host commands received from a host in communication with the DSD.

23. A data storage device (DSD), comprising:
a disk for storing data;
a spindle motor for rotating the disk;
a solid state memory for storing data; and
a controller configured to:
control the spindle motor to rotate the disk to perform at least one operation on the disk;
determine a number of operations performed during a period of time in performing the at least one operation;
determine whether the number of operations performed during the period of time is greater than a target level; and
if it is determined that the number of operations performed during the period of time is not greater than the target level, transfer data between the solid state memory and the disk to increase a number of operations performed on the disk to reach the target level while the disk rotates.

24. The DSD of claim 23, wherein the controller is further configured to set the target level based on a performance limit for performing operations on the disk.

25. The DSD of claim 23, wherein the data transferred between the solid state memory and the disk includes dirty data transferred from the solid state memory to the disk, the dirty data including data that is most recently written for a logical address and that can be used to update the disk by writing the dirty data to the disk for the logical address.

* * * * *